US006854327B2

(12) United States Patent
Rambow et al.

(10) Patent No.: US 6,854,327 B2
(45) Date of Patent: Feb. 15, 2005

(54) APPARATUS AND METHOD FOR MONITORING COMPACTION

(75) Inventors: Frederick Henry Kreisler Rambow, Houston, TX (US); Dennis Edward Dria, Houston, TX (US); David Ralph Stewart, Richmond, TX (US)

(73) Assignee: Shell Oil Company, Houston, TX (US)

( * ) Notice: Subject to any disclaimer, the term of this patent is extended or adjusted under 35 U.S.C. 154(b) by 43 days.

(21) Appl. No.: 10/288,920

(22) Filed: Nov. 6, 2002

(65) Prior Publication Data

US 2004/0083808 A1 May 6, 2004

(51) Int. Cl.⁷ .................................................. G01F 3/14
(52) U.S. Cl. ............................................ 73/250; 324/96
(58) Field of Search ........................ 73/250–253, 293, 73/800; 385/12, 13; 324/96; 356/73.1, 445

(56) References Cited

U.S. PATENT DOCUMENTS

| 5,182,779 | A | * | 1/1993 | D'Agostino et al. .......... 385/13 |
| 5,321,257 | A | | 6/1994 | Danisch ................. 250/227.16 |
| 5,394,488 | A | * | 2/1995 | Fernald et al. ................. 385/13 |
| 5,661,246 | A | | 8/1997 | Wanser et al. ................. 73/800 |
| 5,705,812 | A | | 1/1998 | Brewer et al. ............... 250/264 |
| 5,753,813 | A | | 5/1998 | Hagiwara ................. 73/152.54 |
| 5,818,982 | A | | 10/1998 | Voss et al. ..................... 385/13 |
| 5,835,199 | A | * | 11/1998 | Phillips et al. ............. 356/5.03 |
| 6,252,656 | B1 | | 6/2001 | Wu et al. ................... 356/73.1 |
| 6,346,702 | B1 | | 2/2002 | Davis et al. ............ 250/227.14 |
| 6,354,147 | B1 | | 3/2002 | Gysling et al. ............ 73/61.79 |
| 6,363,089 | B1 | | 3/2002 | Fernald et al. ................. 372/20 |
| 6,450,037 | B1 | | 9/2002 | McGuinn et al. ............. 73/705 |
| 6,487,340 | B2 | * | 11/2002 | Enomoto et al. ............. 385/37 |
| 6,636,041 | B2 | * | 10/2003 | Arz et al. .................... 324/322 |

OTHER PUBLICATIONS

"Characteristics of Short–Period Blazed Fiber Bragg Gratings for use as Macro–Bending Sensors". Applied Optics. 41. 631–636 (2002). Baek. S.. et al.
"Long–Period Fiber Grating Bending Sensors in Laminated Composite Structures". SPIE Conference on Sensory Phenomena and Measurement Instrumentation for Smart Structure and Materials. Mar. 1998, San Diego. CA SPIE vol. 3330. 284–292. Du. W., et al.
"Ultrastrong Fiber Gratings and Their Application". SPIE Conference Photonics East "Optical Fiber Reliability and Testing". 3848–26. Sep. 20. 1999. Starodubov. D. S. et al. Fiber Bragg Grating. 3M US Online. Nov. 27, 2000.

* cited by examiner

*Primary Examiner*—Edward Lefkowitz
*Assistant Examiner*—Alandra Ellington

(57) ABSTRACT

An apparatus and method for continuous, passive detection and measurement of tensile and compressional strain in a structure utilizing a shielded optic fiber, the optic fiber having one or more Bragg gratings thereon, the gratings and shield being disposed in a curved path on the structure and a baseline response for the grating is made using an optical source and detector. Changes in tensile or compressional forces on the structure will result in changes in the curve of the grating, resulting in a frequency shift for the returned light.

28 Claims, 6 Drawing Sheets

FIG. 3a
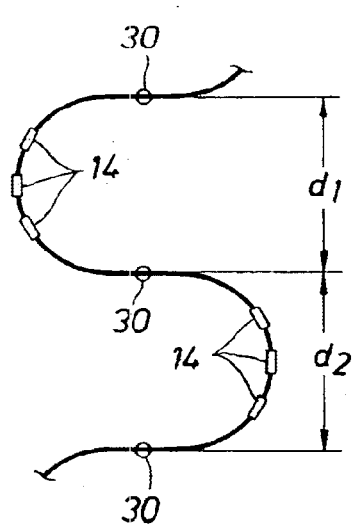
FIG. 3b
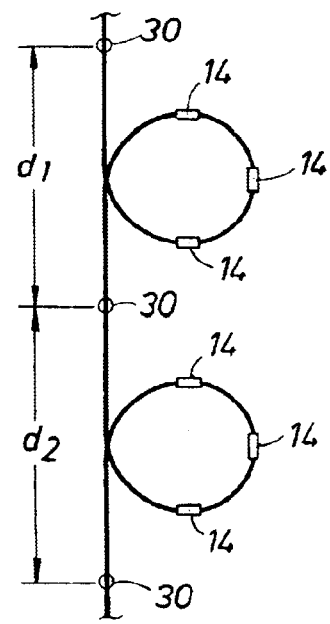
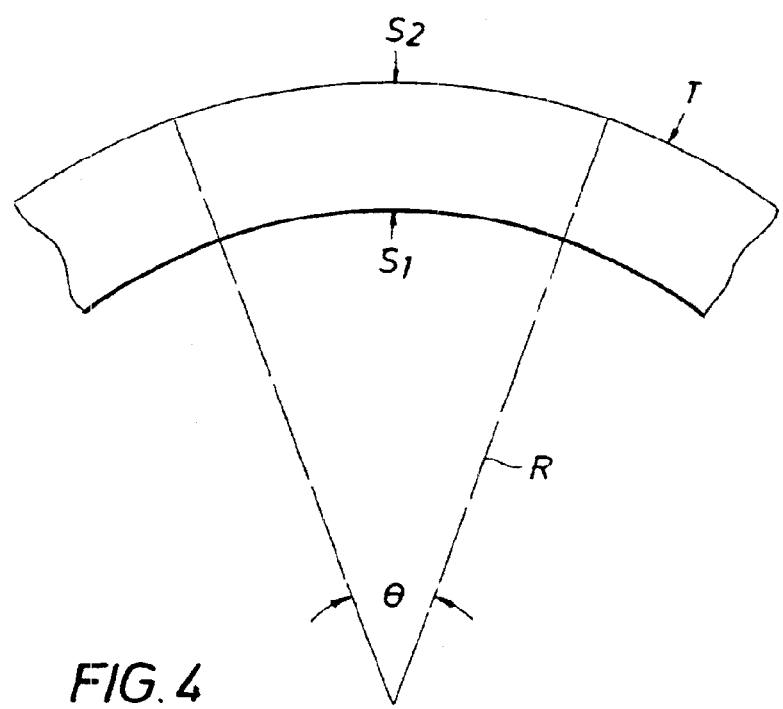
FIG. 4

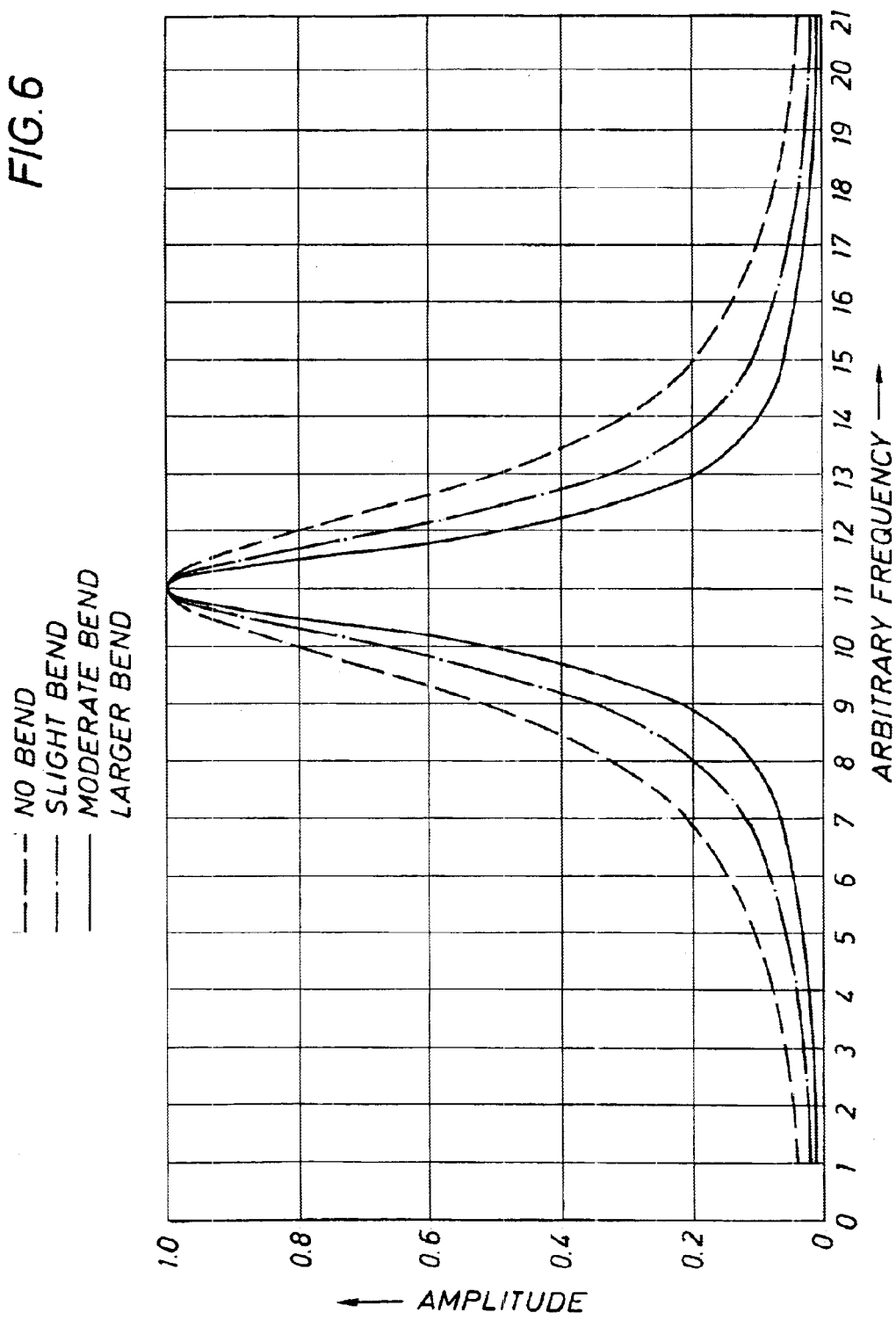

APPARATUS AND METHOD FOR MONITORING COMPACTION

FIELD OF THE INVENTION

This invention is related to well monitoring. More particularly it is related to the detection and measurement of compressional strains, or any large displacement, in casing and well completions. Still more particularly, it is related to a new application for fiber optic sensors comprising attaching passive, uniquely configured, fiber optic sensors, enclosed in a protective sheath, to the inner or outer wall of a well casing to measure its deformation and warn of impending problems or failures. The invention utilizes fiber Bragg gratings subjected to bending which are characterized by a measurable broadening of the reflected frequency peak and, when subjected to compression forces, deform on a scale which would be more expected for a large structure such as a well. In another embodiment of the invention, a loop configuration, the fiber Bragg gratings may exhibit a measurable narrowing of the reflected frequency with compaction forces.

BACKGROUND OF THE INVENTION

Wells in compactable sediments (or tectonically active areas) are subject to deformation over the productive life of the field. The result is the catastrophic loss of producing zones up to and including the loss of a whole well. The problem is exacerbated by the increasingly rapid off-take rates and the completion of multiple zones in a single well. The observable phenomenon is that at first a well casing will bend or begin to buckle, frequently at casing joints, or interfaces in the formation. As the compaction continues, the movement results in a significant misalignment of the well axis. The result can be the complete loss of the well investment resulting in, not only deferred and/or lost production, but even the replacement cost of a well, which is extremely expensive, particularly in deep water. The ability to detect early bending would warn of later buckle or collapse and allow for changes in production practices and/or remedial action. Monitoring compaction in-situ becomes a complex problem. It can be a billion-dollar issue in some highly compressible formations, as wells and sometimes entire fields are put at risk.

The art is filled with hybrid combinations of radioactive tagging and casing monitoring technologies (mechanical, EM, acoustic or video televiewers). The big problem is that all the solutions are intermittent and require human intervention to execute the process.

One method of monitoring compaction known in the art is to apply radioactive tags to the casing and/or shooting radioactive bullets into the formation. This method requires logging tools to be run in the well periodically to monitor relative movement. The well is shut in and there is always a risk to the well any time a tool is run in that it might not come back out. See, for example, U.S. Pat. No. 5,753,813 and U.S. Pat. No. 5,705,812.

It is known in the art to use fiber optics to measure temperature, pressure, flow, and acoustics. See, for example, U.S. Pat. Nos. 6,450,037; 6,363,089; 6,354,147; 6,346,702; and 6,252,656. (CiDRA).

It is known in the art to run fiber optic cable for the measurement of strain, however this is a more subtle measurement than compaction. The amount of strain the fiber can withstand before breaking is usually on the order of one percent. The strain that compacting wells undergo is at least several percent. In compaction applications casing may undergo displacements or deformations that locally are much greater than 10%. Furthermore, the strains on the well are not extensional, but are compressional. Trying to compress a fiber is literally like trying to compress a string. It will buckle unless it is very rigidly held. Also, if it is held rigidly and strained the amount that the well would strain under compaction forces, it would crush and fracture the fiber. Such deformations would easily break fibers or elements that are constrained to the casing and caused to strain with the casing. The present inventors have observed that breaking might be avoided with a properly designed, bent shape or loop shaped sensor.

Although several papers have reported on field use of a variety of fiber optic microbend sensors, most have not found wide use in practice (other than for alarm mode or tactile sensing) due to problems associated with erratic response, tolerances of the deformers, mechanical fatiguing of the fiber, and a limited quantitative understanding of the mode problems and radiation loss associated with the use of highly multimode fiber. All such patents relate to microbending optical fiber rather than to macrobending or non-linear buckling. The significant advantage of the latter over the former relates to the predictability and reproducibility, which are difficult at best in microbending, but readily achievable in macro-bending, which employs non-linear buckling. This feature is especially significant in sensors used for making precise measurements over a wide dynamic range.

U.S. Pat. No. 5,321,257 discloses a fiber optic bending, and positioning sensor comprising a fiber optic guide having a light emission surface extending in a thin band on a side of the fiber for at least part of its length, said light emission surface covered by a coating of light absorbent material. The primary applications are in the fields of sports medicine and biometrics. In addition, this patent uses a polymer fiber. Such a sensor would not be suitable for well applications, because: 1) with plastic there is a higher intrinsic loss of light; 2) distances in wells are closer to kilometers than meters; 3) plastic is not suitable for the higher temperatures typical in wells, because at about 150° F. degradation would set in and temperatures near 200° F. would cause failure; 4) the sensor of '257 depends upon attenuation, rather than scattering.

U.S. Pat. No. 5,661,246 discloses an assembly which allows use of fiber optic displacement sensors in a high-temperature environment comprising a rod attached to an underlying surface at one point and guided to move in a selected direction of measurement, wherein the distance between a selected movable location on the rod and a point fixed on the surface is measured using a bent optical fiber having light loss characteristics dependent on that distance.

U.S. Pat. No. 5,818,982 discloses fiber optic sensors wherein the shape of a length of fiber is changed under carefully controlled boundary conditions, providing a reproducible macrobending-induced loss which can be implemented in a variety of highly precise and a wide range of sensor applications.

One can observe that measurement of bend diameter in untreated fiber does not provide the signal to noise and dynamic range in measurement that would make it practical for downhole applications for monitoring compaction. Light lost at each bend adds up quickly and soon results in a signal that is too low to measure properly.

Fiber Bragg gratings are known in the art and are made by laterally exposing the core of a single-mode fiber to a periodic pattern of intense UV light. This creates areas of increased refractive index within the fiber. The fixed index modulation is referred to as a grating. All reflected light signals combine coherently to one large reflection at one wavelength when the grating period is equal to half the input wavelength. Other wavelengths of light are for all intents and purposes transparent. So, light moves through the grating with negligible attenuation or signal variation. Only the Bragg wavelength is affected. Light of the Bragg wavelength is strongly backreflected. Being able to preset and maintain the grating wavelength is what makes fiber Bragg gratings so useful. See "Fiber Bragg Grating" 3M US Online, 27 Nov. 2000.

Conventional fiber Bragg gratings would not be suitable for monitoring compaction in a well casing, because typically in a passive sensing system the reflected wavelength is changed as the gratings are stretched. Fibers or elements that are constrained to the casing and stretched would break under forces of the magnitude of compaction.

In an article titled, "Characteristics of short-period blazed fiber Bragg gratings for use as macro-bending sensors", APPLIED OPTICS, 41, 631–636 (2002), Baek, S., et al, discuss the characteristics of short-period blazed fiber Bragg gratings for use as macro-bending sensors and that the sensors are able to detect macro-bending with the transmitted power variation of the first side mode in the blazed fiber Bragg grating. This article does not discuss applications.

In a paper titled, "Long-Period Fiber Grating Bending Sensors in Laminated Composite Structures", SPIE Conference on Sensory Phenomena and Measurement Instrumentation for Smart Structures and Materials, March 1998, San Diego, Calif., SPIE Vol. 3330, 284–292, Du, W., et al, present the experimental result of the effect of bending an over-written long-period fiber grating (LPG) on the transmitted power spectrum and total transmitted power of a light-emitting diode (LED). It was found that the total transmitted power through the LPG decreases linearly with bend curvature within the range from 0 to about 0.001/mm. The error for determining the bend curvature due to the actual non-linearity of the sensor is estimated to be +/−2× $10^{-5}$/mm. This work appears to use a highly linear attenuation of the light as a function of very slight bend.

In a paper titled, "Ultrastrong Fiber Gratings and Their Applications", SPIE Conference Phototonics East "Optical Fiber Reliability and Testing", 3848–26, Sep. 20, 1999, Starodubov, D. S., et al, discuss a method of fabricating gratings for sensors through the polymer coating, wherein the fiber surface is never exposed to the environment, which makes the resulting grating predictably strong.

Nothing has been found in the art that suggests bending a fiber Bragg grating, rather than stretching, to produce a measurement transducer for obtaining information on well and field integrity.

It would be enormously valuable in the art if there were a passive method of continually monitoring wells in real-time without physical intervention. It would constitute a great advance if it were possible to continually obtain precision, repeatable measurements. At any given time operators could be aware of well problems, particularly compaction, using highly reliable fiber gauges that should last the life of the well. It would be extremely valuable if there were also a method of passively monitoring in real-time to obtain data on compaction, 4D seismic, and information for geomechanical modeling.

SUMMARY OF THE INVENTION

In accordance with the foregoing the present invention comprises a unique method of configuring fiber Bragg sensors to deform on the scale that could measure large displacements and strains in a well. Reflection amplitude is changed and frequency response is broadened or narrowed predictably. This is made possible by using one or more of a "snake" shaped sensor, a "loop" shaped sensor, and/or a "helical" sensor with bent fiber Bragg gratings essentially positioned in the bends of these sensors, all enclosed in a protective sheath, in a manner whereby response changes caused by displacement forces correspond with the desired property, such as compaction.

The invention is also an apparatus, system, and method for detecting and measuring compressional strains in a well in real-time without physical intervention. The invention is a fiber gauge system incorporated into a structure to be monitored; a passive sensor constantly activated, provides monitoring of compaction, and permits awareness of well problems without having to physically intervene. The system may be either continuously monitored or monitored periodically without entering the well or altering the well in any way. The system comprises one or more fiber Bragg gratings integrated into a fiber optic cable installed in the structure to be monitored, wherein the gratings are bent to provide bandwidth that will alter predictably. In the case of "snake" or "S" shaped sensors, further compression of said structure from compaction results in increases in said bandwidth that can be predicted and calibrated to provide data on compaction. See FIG. 3a. In the case of "loop" shaped sensors, an increase in compression will result in a decrease in bend and a decrease in bandwidth. See FIG. 3b. The fiber gauges are highly reliable and should easily last the life of a well.

With the method of the present invention it is also possible to measure shape and magnitude of deformation in addition to strain.

The method for continuously, passively detecting and measuring compressional strains in real time, without physical intervention, comprises:

1) Attaching to the structure to be monitored an assembly comprising an optical fiber having one or more gratings thereon at selected intervals, axially disposed to and in close proximity with a protective sheath of circular or noncircular cross section, said assembly characterized with one or more bends with fiber gratings positioned in the bends, wherein said protective sheath is made of material sufficiently flexible to displace upon subjection to displacement forces, and bending causes said grated fiber(s) to follow the shape of the protective sheath;

2) Coupling a light source and measuring the wavelength response; and

3) Comparing said wavelength response to a calibration curve to monitor compaction.

The fiber grating may be axially disposed but not attached within the sheath or it may be on the outside and protected by, for example, snapping on the sheath, embedding in the sheath, or being sandwiched between protective layers.

The invention is also a transducer for passively monitoring displacement and strain forces in a structure, comprising:

1) An optical fiber having one or more gratings thereon, axially disposed, but not rigidly attached, in a protective sheath, said fiber and sheath characterized by one or more bends wherein said gratings are positioned in said bends, wherein said protective sheath is made of material sufficiently flexible to bend upon subjection to displacement forces, and wherein bending causes said grated fibers to follow the shape of the protective sheath;

2) A source for providing a broadband or tunable narrow-band optical signal; and 3) An optical detection unit.

The protective sheath may be tubular or it may have a noncircular cross section, as would be apparent to those skilled in the art. As mentioned above, the grated fiber may also be protected by the sheath by embedding, sandwiching, etc.

The present invention is suitable for all deepwater and subsea wells. It is also useful for offshore wells and all onshore wells. Even on a platform with easy accessibility, permanent monitoring is ideally suited and should be cheaper than occasional intervention. It is also conceivable that the invention would be suitable for use in wells in tectonically active areas. The invention could also be used in any other situation where pipes expand and contract, or bend, such as, for example, refineries, gas plants, and pipelines. Those skilled in the art will see that the invention is applicable to detecting any movement and could thus be used for other displacement sensing, applying the same principles to different length scales. The method can also be used to obtain data for other types of geomechanical modeling, including, for example dams or other structures.

BRIEF DESCRIPTION OF THE DRAWINGS

FIG. 3a is a diagram of the embodiment comprising the S shaped or "snake" configuration of the present invention.

FIG. 3b is a diagram of the embodiment comprising the "loop" configuration of the present invention.

FIG. 4 is a diagram showing variables involved in calculating radius of curvature for a bent fiber Bragg sensor.

FIG. 6 is a graph showing expected increase in bandwidth as amplitude vs. frequency.

DETAILED DESCRIPTION OF THE INVENTION

The present invention is a new concept in fiber optic transducer technology for application in wells using bending of fiber Bragg gratings rather than fiber strain. The invention provides compression or large scale tensile monitoring that responds to much larger well strains or movements than those that can be measured with conventional fibers without breaking the fibers. Instead of stretching a fiber, the invention provides bending of fiber Bragg gratings to change amplitude reflection and broaden frequency. In addition, the invention removes the requirement for bonding to substrate, removes present temperature limitations, and potentially has a very high dynamic range.

It is known that an interference pattern can be written on the core of fiber Bragg gratings with UV lasers. When the light is coupled into the fiber, a certain wavelength of light is reflected back through the fiber. The reflected wavelength depends on the spacing of the "written in" grating pattern. In typical use, as the grating is stretched the reflected wavelength changes. As mentioned above, conventional use of fiber Bragg gratings would not be suitable downhole with the magnitude of changes characteristic of compaction.

One of the parameters that designers of fiber gratings have to work with is the tilt angle of the grating fringes in the core of the fiber. As tilt angle increases, the resonance wavelength shifts to longer wavelengths, because the grating period becomes effectively longer with increasing tilt angle. Further, the main-mode dip in transmission becomes shallower with a larger tilt angle, but the transmission dips of the side modes become deeper in spite of the constant UV exposure time, which results from the reduction in effective fringe visibility with the tilt angle.

Figure 1:
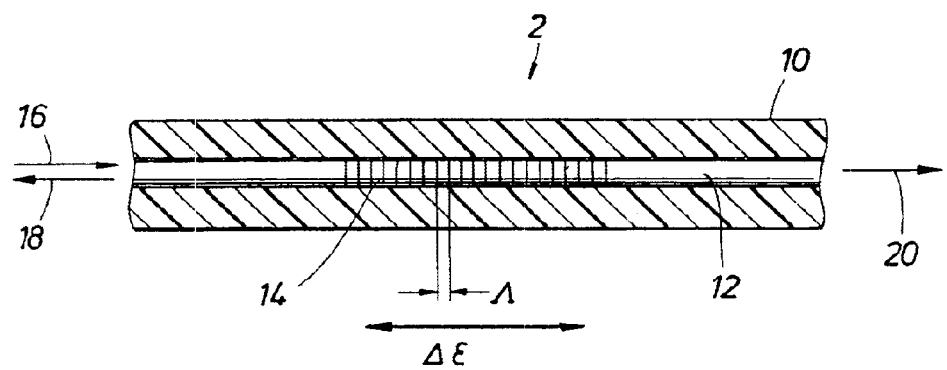
FIG. 1 is a diagram of typical linear Bragg grating sensor.
Figure 1A:
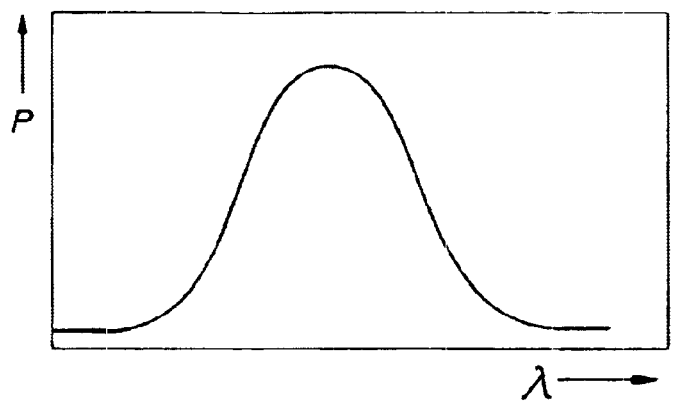
FIG. 1a is a graph of the input spectrum for a typical linear Bragg grating sensor.
Figure 1B:
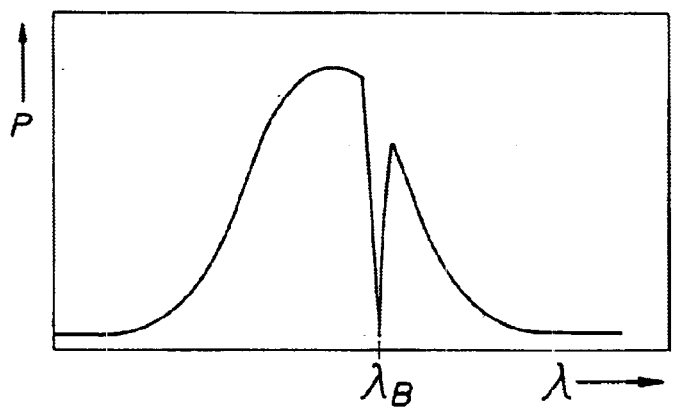
FIG. 1b is a graph of the transmitted spectrum for a typical linear Bragg grating sensor.
Figure 1C:
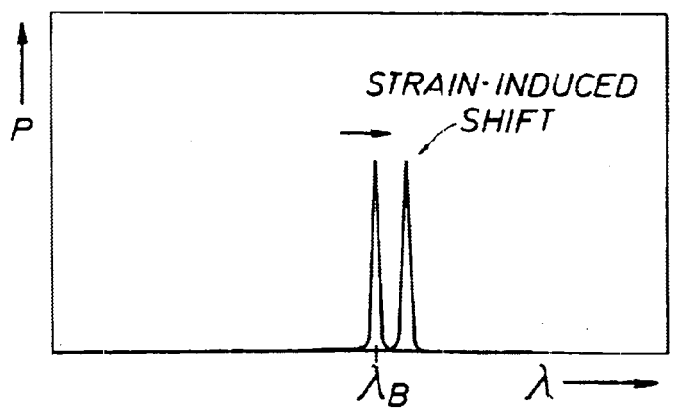
FIG. 1c is a graph of the reflected spectrum for a typical linear Bragg grating sensor.

FIG. 1 is a diagram of a typical linear Bragg grating sensor. The fiber optic sensor 2 is comprised of an outer cladding 10 and an inner fiber core 12. A photo imprinted grating 14 has been imprinted as described above. The coupled light input 16 is shown as entering the fiber optic sensor 2, with the light reflected by the grating is represented as arrow 18, with the continue transmission 20 of the light input 16. The grating 14 has a spacing $\Lambda$. When the fiber optic sensor 2 is placed in tension, the grating will undergo a strain elongation $\Delta\epsilon$ which results in a change in frequency. FIGS. 1a, 1b, and 1c, respectively, are graphs of the input spectrum, transmitted spectrum, and reflected spectrum for a typical linear Bragg grating sensor. For a linear Bragg grating sensor such as this the frequency can be determined using the equation:

$$\Delta\lambda=(1-\rho_e)\lambda\Delta\epsilon, \text{ where } \rho_e \approx 0.22.$$

Figure 2:
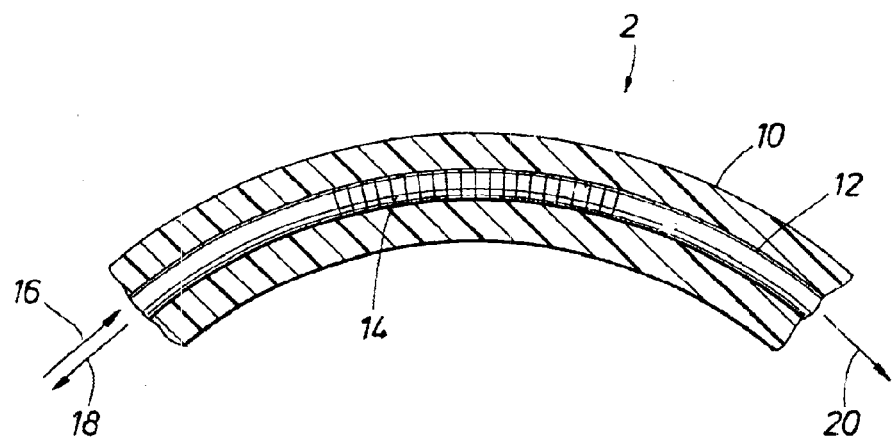
FIG. 2 is a diagram of a bent fiber Bragg grating useful for the present invention.

The present invention utilizes macro-bending to achieve improved sensitivity in a dynamic range and affords resolution in compaction monitoring. When the Bragg grating sensor 2 is bent, the spacing of the fiber Bragg grating 14 varies across the fiber 12 and the incident ray experiences a range of spacings $\Lambda$ (See FIG. 2) in accordance with bending. Bending the fiber as in FIG. 2 results in spreading the grating 14 on the outside of the bend and slight compression on the inside of the bend with accompanying degradation of the bandwidth selectivity. A measurable broadening of the reflected frequency is observed. The transmitted power of the first side mode increases as the radius of curvature of bending becomes smaller. With these bent fiber Bragg gratings 14 present in a well, as strains occur, the fibers 12 bend and the change in bandwidth can be predicted and calibrated to quantify compaction data. FIG. 6, herein, shows changes in transmission spectra of a fiber Bragg grating sensor 2 with macro-bending.

Figure 2A:
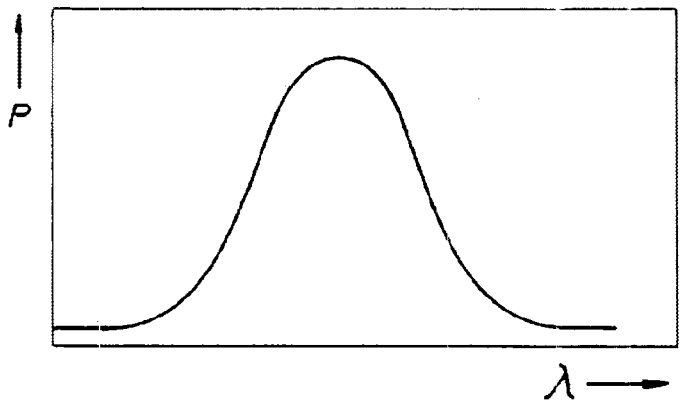
FIG. 2a is a graph of the input spectrum for the bent Bragg grating sensor.
Figure 2B:
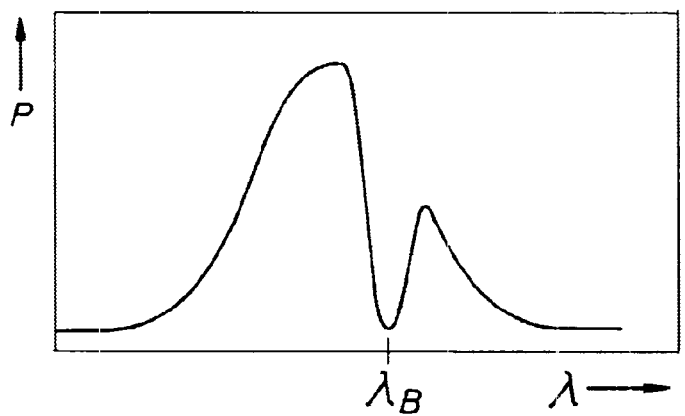
FIG. 2b is a graph of the transmitted spectrum for a bent Bragg grating sensor.
Figure 2C:
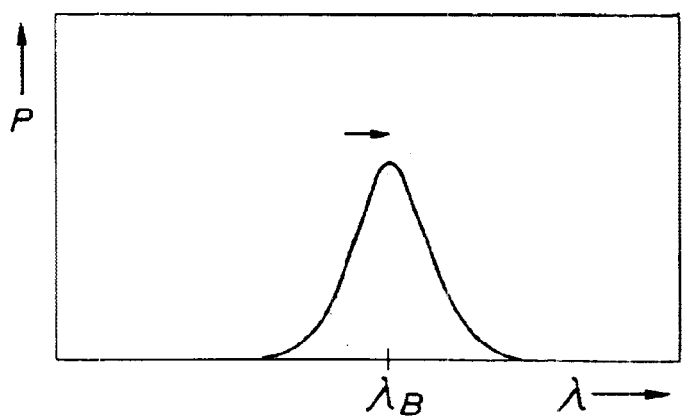
FIG. 2c is a graph of the reflected spectrum for a bent Bragg grating sensor.

FIG. 2b is a graph showing transmitted spectrum for a bent Bragg grating sensor. In comparison to FIG. 1b, for the linear fiber, the peaks are broader. FIG. 2c is a graph showing reflected spectrum for a bent fiber. Again, in comparison to the linear fiber of FIG. 1c, the peak is broader. For the bent Bragg grating fibers the equation, which describes the Delta Lamda (change in wavelength), at any given radius of curvature (R), is:

$$\Delta\lambda = 2n_{\mathit{eff}} \frac{T \cdot \Lambda}{R + T/2}$$

where $\Delta\lambda$=increase in width of wavelength spectrum $n_{\mathit{eff}}$=effective index of refraction of fiber T=thickness of the fiber Bragg grating $\Lambda$=separation or spacing between grating lines=$\pi$(R+T/2)$\theta$ R=radius of curvature of fiber bend In the present invention we have identified several embodiments for utilizing these bent fiber Bragg gratings in a casing or well structure. In one embodiment, FIG. 3a, a "snake" or "S" shaped fiber 2 could be used wherein the Bragg gratings 14 could be located at bends in the "snake" and the protective sheath would be fastened to the casing at attachment point(s), FIG. 3a, 30, so that compaction would result in sharper bends and hence an increase in bandwidth effect. In FIGS. 3a and 3b, the gratings are indicated as existing within the curves by an exaggeration of the fiber itself. The attachment points are only shown by way of illustration and could be at various points. In the "snake" embodiment it would also be possible to observe an increase in $d_1$ and $d_2$ with extension forces, in which case a decrease in diameter and a predictable narrowing of the Bragg grating bandwidth would be observed.

In another embodiment, shown in FIG. 3b as the "loop", one could use loops in the fiber, with the gratings 14 located in the loops and the shielding tubing in which the fiber 2 is enclosed would be fastened, for example, just above and below the loop at attachment point(s), 30. Compaction in this case would result in an increase in the loop diameter and hence decrease in bandwidth. In the case of "loops", a decrease in $d_1$ and $d_2$ produces an increase in loop diameter and a narrowing of the bandwidth. In either configuration, the signal/noise ratio is improved over untreated fibers.

FIG. 4 identifies properties related to radius of curvature of a bent fiber Bragg grating and the relationship of these to reflected wavelength. With reference to FIG. 4 the following symbols are defined:

$\Delta S$=change in optical path length across bent fiber

T=core thickness of the fiber Bragg grating $\Lambda$=separation or spacing between grating lines=$\pi$(R+T/2)$\theta$ $$\theta = \frac{\Lambda}{\pi(R + T/2)}$$

R=radius of curvature of fiber bend $S_1$=inner arc length of fiber core at bend $S_1$=value of $\pi$ R$\theta$ $S_2$=outer arc length of fiber core at bend $S_2$=value of $\pi$(R+T)$\theta$ $S_1 - S_2 = \pi(R)\theta - \pi(R+T)\theta$ $$\Delta S = \frac{T \cdot \Lambda}{R + T/2}$$

resulting in a broadening of the spectrum given by:

$$\Delta\lambda = 2n_{\mathit{eff}} \frac{T \cdot \Lambda}{R + T/2}$$

Figure 5:
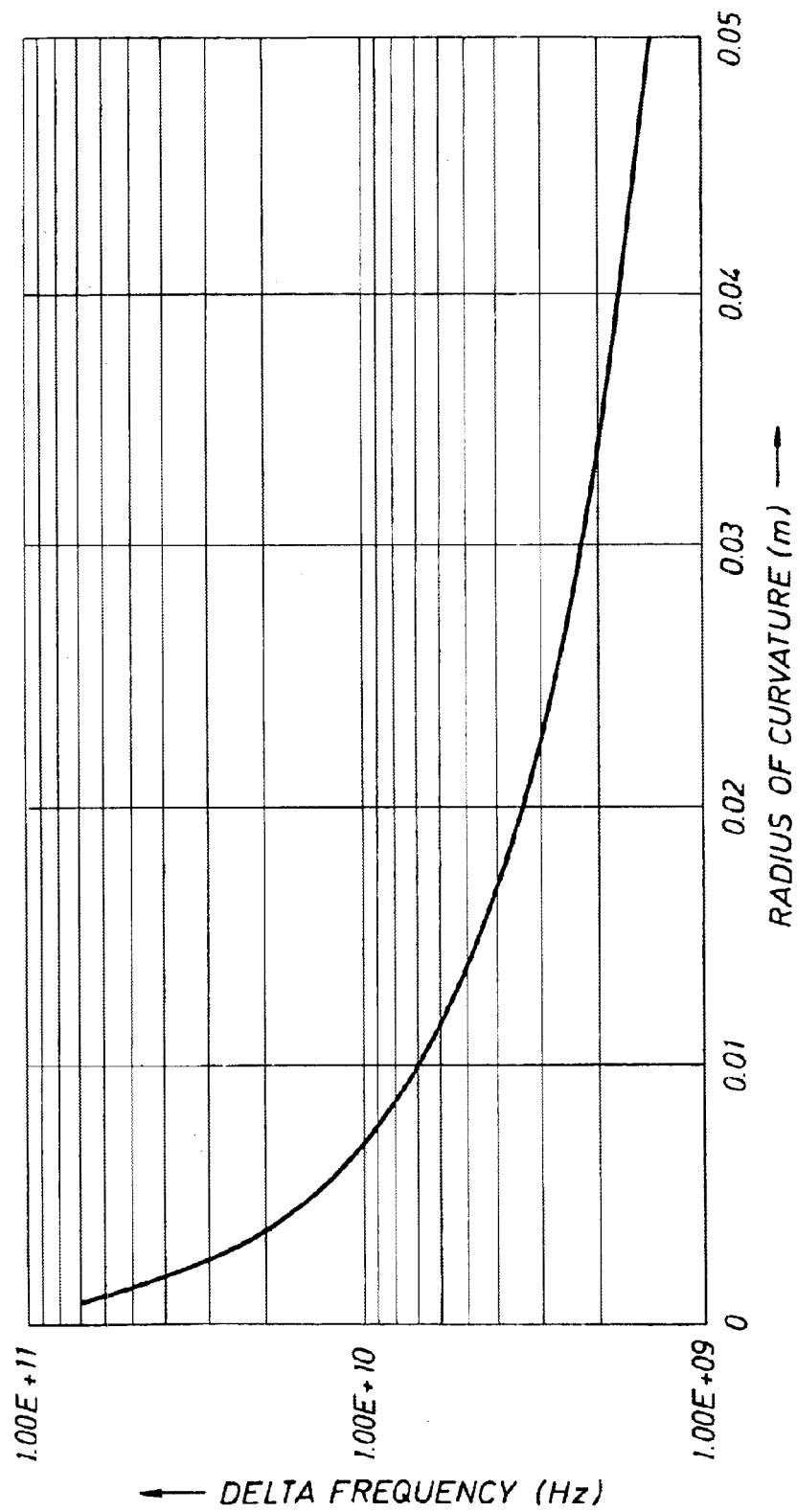
FIG. 5 is a graph showing frequency broadening vs. bend for a fiber optic compaction monitoring system plotted as delta frequency vs. radius of curvature.

With this information it is possible to calibrate and predict increased or decreased bandwidth, depending on the zero point, reflected as compaction strain causes bending of the fiber Bragg grating. FIG. 5 is a graph showing Delta Frequency plotted vs. Radius of Curvature.

FIG. 6 is a graph showing expected change in amplitude for an arbitrary frequency.

The grating(s) can be written on the fiber in a length of fiber optic cable before the fiber is placed in a protective sheath and the assembly can be bent before installation on a well. Alternatively, short pieces of bent fiber gratings might be spliced into longer fibers before they are installed in a protective sheath and then installed on the well.

The protective sheath in which the fiber is enclosed can be constructed of a variety of materials that are flexible enough to displace when subjected to strain and compaction forces, but also able to accommodate temperature and other conditions encountered. Suitable materials include metals, polymers, elastomeric material, composite material, and woven material. Suitable metals would include, but not be limited to steel. Woven materials may include, but not be limited to woven textile and netting.

When situated within the protective sheath the fiber should not need to be attached to the protective sheath, however, optionally the fiber may be surrounded by a viscous liquid or a gas. Suitable viscous liquids would be apparent to those skilled in the art. Suitable gases would include, for example, but not be limited to helium and dry nitrogen gas. Hydrogen would not be used.

Also within the scope of the present invention, the grated fiber could be in close proximity to the protective sheath but snapped onto, embedded within, or sandwiched between protective layers.

The bent fiber Bragg grating displacement and strain detection system includes a source for providing a broadband or tunable narrow-band optical signal, a coupler, at least one, preferably a plurality of bent fiber Bragg gratings, and an optical detection unit. A tunable narrow-band optical signal could be provided, for example, by a fiber tunable laser.

The source for providing a broadband includes a narrow source swept over a broad band, and provides a broadband optical signal via a coupler to the fiber Bragg gratings. Broadband sources are known in the art and the scope of the invention is not intended to be limited to any particular type thereof.

The bent fiber Bragg gratings respond to the source providing a broadband or tunable narrow-band optical signal, and further respond to a physical parameter, such as, for example, compaction strain, for providing a fiber Bragg grating optical signal containing information about the parameter via the coupler to the optical detection unit. The information communicated by the fiber Bragg grating optical signal is in the form of the peak associated with each fiber Bragg grating wavelength.

The fiber Bragg gratings bent to produce the passive sensors of the present invention are known in the art and the scope of the invention is not intended to be limited to any particular type thereof.

The optical detection unit responds to the fiber Bragg grating optical signal, performs an optical-to-electrical signal conversion, and provides an optical detection unit signal.

Optical detection units are known in the art and the scope of the invention is not intended to be limited to any particular type thereof.

With the method of the present invention it is also possible to measure shape and magnitude of deformation in addition to strain and bending. This can be accomplished by adding multiple elements of either configuration (See FIGS. 3a and 3b) with appropriate orientation and attachment to structure being monitored. Required orientation will be obvious to those skilled in the art. See U.S. Pat. No. 5,321,257, which discloses a fiber optic bending and positioning sensor, incorporated by reference herein in the entirety.

The following example will serve to illustrate the invention disclosed herein. The example is intended only as a means of illustration and should not be construed as limiting the scope of the invention in any way. Those skilled in the art will recognize many variations that may be made without departing from the spirit of the disclosed invention.

EXAMPLE

In the Example a fiber laser, FineTune™, commercially available from Bragg Photonics, was subjected to bending. The specifications of the fiber laser were as follows:

| PARAMETERS | SPECIFICATIONS |
| --- | --- |
| Operation Wavelength | C-Band |
| Tunable Laser Wavelength (nm) | >25 nm |
| Laser Linewidth (kHz) | <100 |
| Tunable Resolution (nm) | 0.035 |
| Wavelength Stability (nm) | 0.06 |
| Wavelength Accuracy (nm) | 0.05 |
| Output Power (mW) | ≻ 5 Standard Higher power optional |
| Connector | FC/APC |

In this fiber the gratings were perpendicular to the fiber axis and rotation of the fiber did not affect results. With respect to polarization of light and bend there was complete axiosymetry around the fiber. For the bent Bragg grating fibers the equation, which describes the Delta Lamda (change in wavelength), at any given radius of curvature (R) is:

$$\Delta\lambda = 2n_{eff} \frac{T \cdot \Lambda}{R + T/2}$$

where
Δλ=increase in width of wavelength spectrum
$n_{eff}$=effective index of refraction of fiber
T=thickness of the fiber Bragg grating
Λ=separation or spacing between grating lines=π(R+T/2)θ
R=radius of curvature of fiber bend

We claim:

1. A transducer for passively monitoring displacement forces in a structure comprising:
   a) A source for providing a broadband or tunable narrowband optical signal;
   b) An optical detection unit; and
   c) An optical fiber having one or more gratings thereon axially disposed to and in close proximity to a protective sheath of circular or noncircular cross section, said fiber grating and sheath characterized by one or more bends, causing a radial distortion in said grating, wherein said protective sheath is made of material sufficiently flexible to bend upon subjection to displacement forces, and wherein bending causes said grated fiber(s) to follow the shape of the protective sheath, the detection unit thereby measuring a change in frequency of a returned signal as a function of a change in radial distortion of the gratings.

2. The transducer of claim 1 wherein the grated fiber is axially disposed within the protective sheath, but not rigidly attached.

3. The transducer of claim 1 wherein the grated fiber is axially disposed to and on the outside of the protective sheath.

4. The transducer of claim 1 further comprising the grated optical fiber is axially disposed within the protective sheath and is optionally surrounded by a viscous fluid.

5. The transducer of claim 1 further comprising the grated optical fiber is axially disposed within the sheath and is optionally surrounded by a gas.

6. The transducer of claim 5 wherein a gas is used and is selected from helium and dry nitrogen gas.

7. The transducer of claim 3 further comprising the protective sheath is made of an elastomer and the grated optical fiber is molded into the elastomer.

8. The transducer of claim 3 further comprising the protective sheath is made of an elastomer and the grated optical fiber is sandwiched between two elastomeric layers.

9. The transducer of claim 3 further comprising the protective sheath is made of elastomeric material and the grated optical fiber is sandwiched between the elastomeric material and the structure to be monitored.

10. The transducer of claim 1 further comprising the protective sheath is attached to the inner or outer wall of a structure.

11. The transducer of claim 3 further comprising the grated optical fiber is snapped onto the outside of the protective sheath.

12. The transducer of claim 1 further comprising the bends in the sheath and axially disposed fiber grating at one or more positions have a shape selected from S-shaped bends, loops, and helical shapes.

13. A method for continuously, passively detecting and measuring displacement (compaction) of a structure which includes the following elements:
   a) Attaching to the structure to be monitored a protective sheath of circular or noncircular cross section and having axially disposed in close proximity thereto, and positioned to move therewith, an optical fiber(s) having one or more gratings thereon at selected points, said protective sheath and grating being characterized by one or more bends, said bend introducing radial distortion in said grating, wherein said protective sheath is made of material sufficiently flexible to displace upon subjection to displacement forces, and bending causes said grated fiber(s) to follow the shape of the protective sheath; and
   b) Coupling a light source and measuring wavelength response of the grating to said light source;
   c) Wherein subjecting the bent grated fibers to displacement forces causes a change in the radial distortion of said grating and the wavelength response is altered in a predictable way, and
   d) Comparing said wavelength response with a calibration curve and estimating the magnitude of displacement.

14. The method of claim 13 wherein the grated optical fiber is axially disposed to and on the outside of the protective sheath.

15. The method of claim 13 further comprising the grated fiber and protective sheath bends at one or more point(s) includes a shape selected from S-shaped, looped, or helical shape.

16. The method of claim 15 further comprising compaction of the S-shaped fiber results in sharper bends and an increase in bandwidth.

17. The method of claim 15 further comprising extension of the S-shaped fiber results in a decrease in diameter and narrowing of bandwidth.

18. The method of claim 15 further comprising compaction causes an increase in loop(s) diameter and a decrease in bandwidth.

19. The method of claim 15 further comprising an increase in loop diameter produces a narrowing of bandwidth.

20. The method of claim 13 further comprising for the bent grating the equation, which describes the Delta Lamda (change in wavelength), at any given radius of curvature (R) is:

$$\Delta \lambda = 2 n_{\mathit{eff}} \frac{T \cdot \Lambda}{R + T/2}$$

where $\Delta\lambda$=the change in width of wavelength spectrum $n_{\mathit{eff}}$=the effective index of refraction of fiber T=the thickness of the fiber grating $\Lambda$=the separation or spacing between grating lines=$\pi$(R+T/2)$\theta$ R=the radius of curvature of fiber bend.

21. The method of claim 13 wherein the grated optical fiber is axially disposed within the protective sheath and further comprising it is surrounded by a viscous fluid.

22. The method of claim 13 wherein the grated fiber is axially disposed within the protective sheath and is optionally surrounded by a gas.

23. The method of claim 22 wherein a gas is used and is selected from helium and dry nitrogen gas.

24. The method of claim 14 further comprising the protective sheath is an elastomer.

25. The method of claim 24 further comprising the grated fiber is molded into the protective sheath.

26. The method of claim 24 further comprising the grated optical fiber is sandwiched between two or more elastomeric layers.

27. The method of claim 24 further comprising the grated optical fiber is sandwiched between the elastomeric material and the structure to be monitored.

28. The method of claim 13 further comprising the protective sheath is attached to the inner or outer wall of a structure.

* * * * *